United States Patent [19]

Chuang

[11] 4,454,677

[45] Jun. 19, 1984

[54] HOUSING FOR ELECTRICALLY ENERGIZED KILLING ASSEMBLY

[75] Inventor: Alan Chuang, Taipei, Taiwan

[73] Assignee: Armatron International, Inc., Melrose, Mass.

[21] Appl. No.: 462,757

[22] Filed: Feb. 1, 1983

[51] Int. Cl.³ .............................................. A01M 1/22
[52] U.S. Cl. ...................................................... 43/112
[58] Field of Search .................................... 43/112, 98

[56] References Cited

U.S. PATENT DOCUMENTS

| | | | |
|---|---|---|---|
| Re. 18,294 | 12/1931 | Frost | 43/112 |
| 1,539,360 | 5/1925 | Knutsson | 43/112 |
| 3,177,609 | 4/1965 | De Marco | 43/112 |
| 3,473,251 | 10/1969 | Kahn | 43/112 |

*Primary Examiner*—Gene P. Crosby
*Attorney, Agent, or Firm*—Thompson, Birch

[57] ABSTRACT

A housing is disclosed for an insect killing assembly of the type having an elongated light source protruding downwardly from a mounting shelf. The light source is surrounded by an electrically conductive grid supported by legs depending from the lower surface of said shelf. The light source and the grid are energized by an A.C. source via circuit components including a voltage augmenting transformer carried on the top surface of the shelf. The housing includes an open-ended enclosure surrounding the insect killing assembly. The enclosure is defined by a pair of separable half-sections which are each provided with an array of holes through which insects may pass as they are attracted by the light source onto the energized grid. A removable base closes the lower end of the enclosure. A one-piece water impervious cover is detachably mounted to the upper end of the enclosure. The cover cooperates with the half sections and the mounting shelf to isolate the circuit components from external moisture.

4 Claims, 3 Drawing Figures

HOUSING FOR ELECTRICALLY ENERGIZED KILLING ASSEMBLY

FIELD OF THE INVENTION

This invention relates to a housing for an electrically energized insect killing assembly.

BACKGROUND OF THE INVENTION

Low cost electrically energized insect killing devices are now on the market. Such devices include an insect killing assembly of generally conventional design surrounded by a housing split lengthwise from top to bottom into two mating parts. The mating parts are assembled around the insect killing assembly and are held together by externally applied retaining rings as well as by screws.

A drawback with such devices lies in the fact that because the housing is split lengthwise from top to bottom, rainwater has a tendency to penetrate between the mating parts and to short out the electrical circuit components.

SUMMARY OF THE INVENTION

The major objective of the present invention is to improve on the above-described conventional arrangement by surrounding the insect killing assembly with an open-ended enclosure defined by a pair of separable half-sections which are provided with an array of holes through which insects may pass, and by closing the upper end of the enclosure by means of a one-piece water impervious cover which cooperates with the aforesaid half-sections to exclude water from penetrating into areas of the housing where electrical components are located.

This and other objectives and advantages of the present invention will be described in more detail with reference to the accompanying drawings, wherein:

DETAILED DESCRIPTION OF PREFERRED EMBODIMENT

Figure 3:
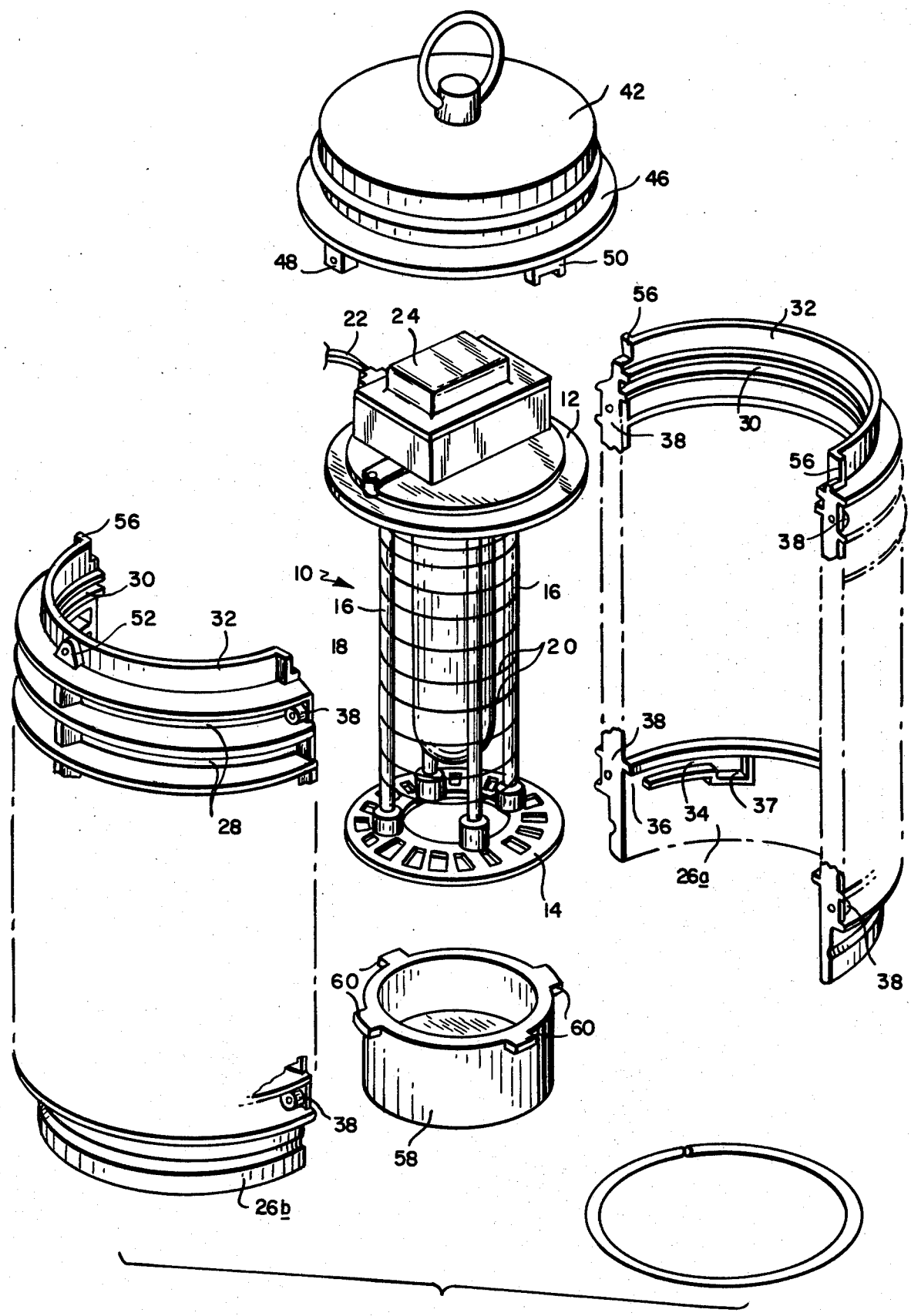
FIG. 3 is an exploded perspective view of the same insect killing device.

An insect killing device in accordance with the present invention includes an inner killing asembly 10 of the type best shown in FIG. 3. The assembly 10 has a circular mounting shelf 12 connected to a generally annular base plate 14 by a plurality of depending legs 16. A light source 18 protrudes downwardly from the shelf 12 where it is surrounded by an electrically conductive grid 20 wrapped around the legs 16. The light source 18 and the grid 20 are energized in a conventional manner by an A.C. power source (not shown) via a supply cord 22 and circuit components including a voltage augmenting transformer 24 carried on the top surface of the mounting shaft 12.

The assembly 10 is surrounded by an open-ended enclosure defined by a pair of separable half-sections 26a, 26b. The half-sections each have an array of holes 28 through which insects may pass as they are attracted by the light source 18 onto the energized grid 20. The upper end of each half section has a semi-circular internal groove 30 located just below a semi-circular wall section 32. An internal semi-circular ledge 31 is located at the lower portion of each half-section. Short internal grooves 34 with downwardly facing access openings 36 and downwardly stepped portions 37 are located below the ledge 31.

Figure 1:
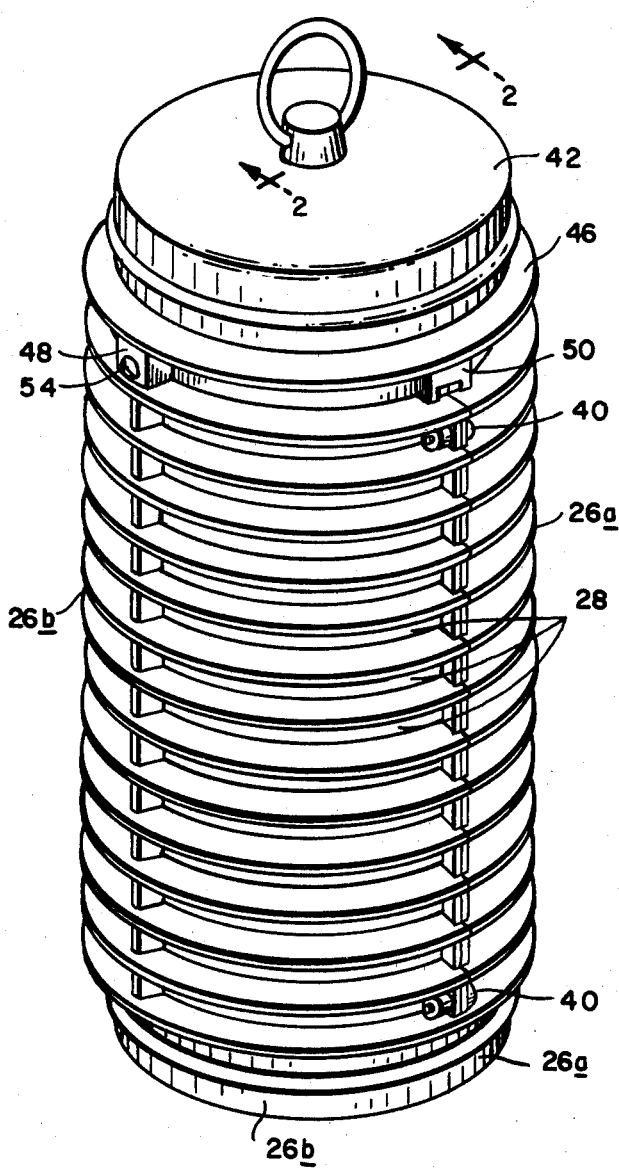
FIG. 1 is a view in perspective of an insect killing device having a housing constructed in accordance with the present invention.
Figure 2:
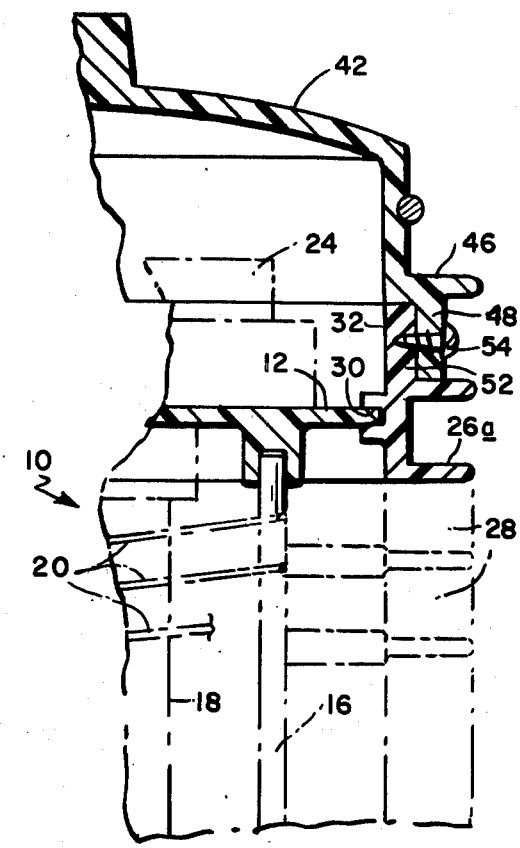
FIG. 2 is a partial vertical sectional view of the housing taken along line 2—2 of FIG. 1.
Figure 2:
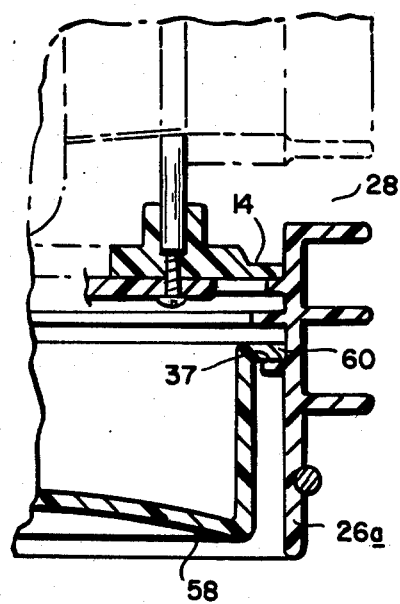

When the half-sections are assembled around the assembly 10 as shown in FIGS. 1 and 2, the peripheral edge of the shelf 12 is received and held in the internal grooves 30, and the annular base plate 14 is radially confined within the lowermost end of the enclosure and supported on the ledges 31.

The mating edges of the half-sections are provided with apertured bosses 38 for receiving screws 40 which hold the half-sections together.

A one-piece water impervious cover 42 closes the top of the enclosure. The cover 42 cooperates with the mounting shelf 12 and the wall sections 32 to form a chamber 44 within which the circuit components including the transformer 24 are isolated from exposure to external moisture. An external radially extending flange 46 on the cover 42 acts to deflect rain away from the chamber 44. The cover has depending legs 48 and 50. The legs 48 are apertured and are arranged to be aligned with apertured bosses 52 on the half sections. Screws 54 extend through apertured legs 48 and bosses 52 to hold the cover in place.

The depending legs 50 have bifurcated lower ends which overlap and grip opposed ears 56 at the interface between the half sections 26a, 26b.

The lower end of the enclosure is closed by a removable cup 58 having opposed radially extending ears 60. The ears 60 are dimensioned to be received in the access openings 36, after which when the cup is turned, the ears proceed along the short grooves 34 to eventually become removably locked in the downwardly stepped portions 37. The cup provides a removable receptacle for holding insects which fall away from the energized grid 20 after being electrocuted.

In light of the above, it will now to be understood that the present invention provides a distinct improvement over prior art housings in that the electrical components supported on the mounting shelf 12 are safely isolated from external moisture, while still allowing the major portion of the housing to remain split into two separable half-sections.

I claim:

1. A housing for an insect killing assembly of the type having an elongated light source protruding downwardly from a mounting shelf, the said light source being surrounded by an electrically conductive grid supported by means depending from the lower surface of said shelf, said light source and said grid being energized by an A.C. source via circuit components including a voltage augmenting transformer carried on the top surface of said shelf, said housing comprising;

an enclosure having open ends and surrounding said assembly, said enclosure being defined by a pair of separable half-sections which are each provided with an array of holes through which insects may pass as they are attracted by said light source onto said energized grid;

a removable base closing the lower end of said enclosure; and a one-piece water impervious cover detachably mounted to the upper end and closing the upper end of said enclosure, said cover cooperating with said half-sections and said mounting shelf to isolate said circuit components from external moisture.

2. The housing of claim 1 wherein said half sections cooperate in defining an internal groove in which is seated the peripheral edge of said mounting shelf.

3. The housing of claims 1 or 2 wherein said enclosure is cylindrical and wherein said half-sections are semi-cylindrical.

4. The housing of claim 2 wherein said half-sections further cooperates in defining a wall extending upwardly from said internal groove to surround said circuit components, and wherein said cover has an external flange extending radially outwardly beyond said wall.

* * * * *